United States Patent [19]

Watanabe

[11] Patent Number: 5,800,938
[45] Date of Patent: Sep. 1, 1998

[54] SANDWICH-TYPE SOLID POLYMER ELECTROLYTE FUEL CELL

[75] Inventor: Masahiro Watanabe, No. 2421-8, Wadamachi, Kofu-shi, Yamanashi, Japan

[73] Assignees: Tanaka Kikinzoku Kogyo K.K., Japan; Stonehart Associates Inc., Madison, Conn.; Masahiro Watanabe, Japan

[21] Appl. No.: 566,941

[22] Filed: Dec. 4, 1995

Related U.S. Application Data

[63] Continuation-in-part of Ser. No. 125,637, Sep. 22, 1993, Pat. No. 5,472,799.

[30] Foreign Application Priority Data

Sep. 22, 1992 [JP] Japan ................. 4-277959

[51] Int. Cl.⁶ ................. H01M 4/86; H01M 8/10
[52] U.S. Cl. ................. 429/30; 429/33; 429/42
[58] Field of Search ................. 429/30, 33, 42

[56] References Cited

U.S. PATENT DOCUMENTS

| | | | |
|---|---|---|---|
| 5,234,777 | 8/1993 | Wilson | 429/33 |
| 5,242,764 | 9/1993 | Dhar | 429/30 |
| 5,246,792 | 9/1993 | Watanabe | 429/33 |
| 5,272,017 | 12/1993 | Swathirajan et al. | 429/33 |
| 5,346,780 | 9/1994 | Suzuki | 429/42 |
| 5,518,831 | 5/1996 | Tou et al. | 429/42 |

*Primary Examiner*—Stephen Kalafut
*Attorney, Agent, or Firm*—Klauber & Jackson

[57] ABSTRACT

Disclosed is a sandwich-type solid polymer electrolyte fuel cell comprising in sequence, a cathode current collector; a cathode electrically connected to the cathode current collector, said cathode containing an ion exchange resin and cathode catalyst particles in electrical communication with the cathode; an ion exchange membrane; an anode containing an ion exchange resin and anode catalyst particles in electrical communication with the anode; and an anode current collector electrically connected to the anode. The cathode and/or anode contain, in the ion exchange resin, catalyst metals capable of promoting the reaction of hydrogen and oxygen gases to produce water. The catalyst metals are insulated electrically from the current collectors due to the presence of the ion exchange resin which has no electrical conductivity.

8 Claims, 2 Drawing Sheets

SANDWICH-TYPE SOLID POLYMER ELECTROLYTE FUEL CELL

CROSS-REFERENCE TO RELATED APPLICATION

This application is a continuation-in-part of application Ser. No. 08/125,637 filed Sep. 22, 1993, now U.S. Pat. No. 5,472,799 issued Dec. 5, 1995.

BACKGROUND OF THE INVENTION

The present invention relates to a sandwich-type solid polymer electrolyte fuel cell. The fuel cell of the invention prevents the lowering of cell voltage by eliminating the crossover of a reactant gas and a liquid. The fuel cell of the invention also utilizes a hydrocarbon ion exchange membrane which is inexpensive and has a low resistance.

Solid polymer electrolyte fuel cells have attracted attention for use as power sources in automobiles and space craft since they are compact and produce high current densities as compared to phosphoric acid fuel cells.

The structure of a conventional fuel cell is typically a five-layer sandwich consisting of a cathode current collector, a cathode (containing a cathode electrocatalyst) electrically connected to the cathode current collector, a solid polymer electrolyte (i.e. ion exchange membrane), an anode (containing an anode electrocatalyst) and an anode current collector electrically connected to the anode.

In a typical fuel cell, hydrogen and oxygen gases are supplied to and diffuse into the anode and cathode, respectively. The hydrogen gas produces hydrogen ions and electrons on the anode electrocatalyst (which is in contact with the anode current collector). The electron migrates to the cathode through a lead (which is in contact with the anode current collector and the cathode current collector), and the hydrogen ion migrates to the cathode through the electrolyte membrane to react with the oxygen gas and the electrons on the cathode electrocatalyst to produce water.

When the electrons pass through a load on the lead, electricity is taken out as energy. in order to convert the chemical energy possessed by the hydrogen gas into the electrical energy, it is essential to immediately separate the electrons from the hydrogen gas on the anode catalyst which is subsequently provided to the oxygen gas through the external lead. If the electrons possessed by the hydrogen gas are furnished to the oxygen gas on the cathode electrocatalyst through a direct reaction to produce water, only thermal energy, rather than electrical energy, can be obtained from the fuel cell.

When the electrolyte membrane is thin, a portion of the hydrogen gas supplied to the anode diffuses through the membrane and arrives at the cathode and therein directly reacts with the oxygen gas supplied to the cathode on the cathode electrocatalyst to form water. in a similar manner, a portion of the oxygen gas supplied to the cathode diffuses through the membrane and arrives at the anode and therein directly reacts with the hydrogen gas supplied to the anode on the anode electrocatalyst to form water. Under these circumstances, the anode and/or the cathode electrocatalyst employed in the above electrochemical reaction involving such hydrogen ions and electrons is likely to be involved in a chemical reaction or so-called "chemical short" wherein the hydrogen and oxygen gases directly react with one another, thereby wasting some of the electrical energy which could otherwise be produced by the fuel cell and resulting in a reduction in electrocatalytic activity and cell voltage decrease.

The lowering of the cell voltage due to crossover of the hydrogen and oxygen gases has been conventionally prevented by reducing the permeation of the gases in the membrane by means of utilizing relatively thick membranes having a minimum thickness, e.g. about 100 μm. As the thickness of the membrane increases, so does the electrical resistance, thereby resulting in a reduction in current density.

It has now been found that it is possible to depress the so-called "chemical short" by utilizing a catalyst (hereinafter referred to as a "reaction" catalyst) in the electrolyte membrane comprised of an ion exchange resin or by incorporating the reaction catalyst in the anode and/or cathode and dispersing the reaction catalyst within an ion exchange resin such that the dispersed reaction catalyst is electrically insulated from the anode and cathode electrocatalysts (and hence electrically insulated from their respective current collectors).

The present invention permits the hydrogen and oxygen gases diffusing in the membrane to be converted into water before they reach the cathode and anode electrocatalysts, respectively. As a result, there is no decrease in cell voltage. Furthermore, the water produced in the membrane has a tendency to suppress the tendency of the gases to diffuse through the membrane.

If the reaction catalyst is not electrically insulated, it functions as an electrocatalyst. Since the reaction catalyst is located within the anode and cathode catalyst layers, the reaction catalyst produces the effect of placing the anode and cathode catalyst layers close to both sides of the electrolyte membrane. Thus, when the reaction catalyst is not electrically insulated, the "chemical short" is likely to occur between the hydrogen and oxygen gases diffusing through the membrane.

A perfluorocarbon membrane of a sulfonic acid type or a carboxylic acid type which is chemically stable is typically employed as the ion exchange membrane for the fuel cell. The choice of a perfluorocarbon membrane results from the fact that cheap hydrocarbon ion exchange membrane will deteriorate due to oxidative decomposition caused by a radical generated in a cathode reaction. Since the chemically stable perfluorocarbon type ion exchange membrane possesses a large molecular weight, an equivalent weight (EW) per unit functional group is large so that ionic conductivity decreases and resistance increases. In other words, conventional fuel cells exhibit several drawbacks: the ionic conductivity is large and a long life cannot be achieved by employing the cheap hydrocarbon ion exchange membrane; moreover, the membrane thickness cannot be reduced to lower the resistance in the case of the perfluorocarbon type membranes.

SUMMARY OF THE INVENTION

An object of the present invention is to provide a solid polymer electrolyte fuel cell which prevents a reduction of cell voltage which would otherwise occur as a result of the crossover of a gas through a membrane of the fuel cell and which enables the usage of a thin membrane having a thickness of less than 100 μm as well as the usage of an inexpensive hydrocarbon ion exchange membrane which has high ionic conductivity although its chemical stability is low.

The present invention comprises a sandwich-type solid polymer electrolyte fuel cell comprising in sequence, a cathode current collector, a cathode electrically connected to the cathode current collector, said cathode containing cathode electrocatalyst particles, an ion exchange membrane, an anode containing an anode electrocatalyst particles and an anode current connector electrically connected to the anode, said cathode and/or anode containing highly dispersed catalyst metal particles in the cathode and/or anode ion exchange resin. The catalyst metal particles, comprise materials capable of promoting the reaction of hydrogen and oxygen gases to produce water. The catalyst metal particles will have their surfaces coated with the cathode and/or anode ion exchange resin or will be dispersed in the cathode and/or anode ion exchange resin such that the resultant coated or dispersed catalyst metal particles are electrically insulated from the cathode electrocatalyst and from the anode electrocatalyst. The membrane may also be impregnated with the catalyst metal particles (which can act in a manner similar to those in the anode and/or cathode).

The fuel cell of the present invention is capable of reducing the decrease of the cell voltage since it enables the conversion of crossover hydrogen and oxygen gases into water before a "chemical short" can occur. Moreover, the radical which is likely to result in a deterioration of the inexpensive hydrocarbon ion exchange membrane is diminished as a result of the presence of the electrically insulated reaction catalyst particles, thereby permitting usage of a hydrocarbon ion exchange membrane which is inexpensive and which has a low internal resistance.

DETAILED DESCRIPTION OF THE INVENTION

Figure 1:
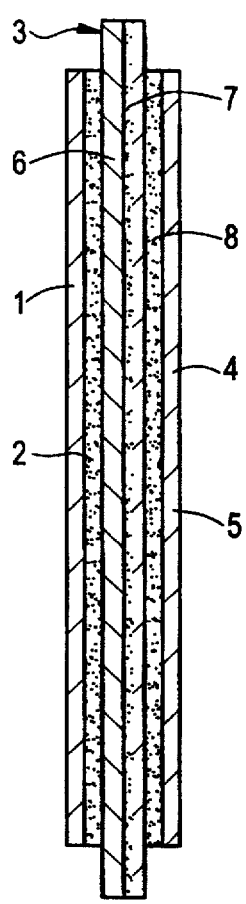
FIG. 1 is a longitudinal section showing one embodiment of a solid polymer electrolyte fuel cell in accordance with the present invention.

The present invention comprises a sandwich-type solid polymer electrolyte fuel cell comprising in sequence: a cathode current collector; a cathode electrically connected to the cathode current collector, said cathode containing a cathode ion exchange resin and cathode electorcatalyst particles in electrical communication with the cathode; an ion exchange membrane; an anode containing an ion exchange resin and anode catalyst particles in electrical communication with the anode; and an anode current collector electrically connected to the anode. The cathode and/or anode contain, in the cathode and/or anode ion exchange resin, catalyst metal particles capable of promoting the reaction of hydrogen and oxygen gases to produce water. The catalyst metal particles are insulated electrically from the current collectors due to the presence of the ion exchange resin which has no electrical conductivity.

Humidification of the cathode and the anode, if required, may be supplied by the water produced as a result of the reaction of hydrogen and oxygen gases catalyzed by the catalyst particles present on the cathode and the anode (and, if present, by the catalyst particles in the membrane).

The catalyst metal particles which are capable of promoting the reaction of hydrogen and oxygen gases to form water may also be present in the ion exchange membrane in addition to being present in the ion exchange resin contained in the cathode and/or the anode. The catalyst metal particles are desirably contained in the ion exchange membrane in the form of a layer as an option which is perpendicular to a direction of gas permeation such that the catalyst particles may come into contact as much as possible with the hydrogen and oxygen gases to form water. After, for example, a layer of catalyst metal particles is formed on one of two ion exchange membranes by supporting a layer of desired thickness of the catalyst particles by means of sputtering or the like, the two membranes interposing the layer of catalyst metal particles therebetween may be integrated by means of hotpressing or the like so as to result in an integral membrane. In another option, the catalyst metal particles are contained in the cathode and/or anode ion exchange membrane in a uniformly dispersed form by ion exchanging with the catalyst metal ions followed by reduction with a reducing agent.

Due to the risk of deterioration of the ion exchange membrane on the cathode side as a result of a radical generated by the cathode reaction with oxygen gas supplied to the cathode, it is preferred that the membrane on the cathode side be comprised of a material having a high degree of chemical stability and a relatively high equivalent weight. Since the anode side of the membrane is not in contact with the radical, the anode side of the membrane may be comprised of a material having a lower degree of chemical stability and a lower equivalent weight, thereby decreasing the internal resistance of the cell.

The material for the membrane, especially for the cathode side of the membrane, may be a perfluorocarbon ion exchange resin which contains sulfonic acid or carboxylic acid groups. Alternatively the material for the membrane, especially for the anode side of the membrane, may be a hydrocarbon ion exchange resin containing sulfonic acid or carboxylic acid groups. The advantages of both types of membrane materials may be realized by using a composite membrane composed of a perfluorocarbon ion exchange resin and a hydrocarbon ion exchange resin.

The cathode and anode may be prepared by supporting electrocatalyst particles, e.g. particles of platinum metal on carbon in a conventional manner. The electrocatalyst particles present in the cathode and the anode will be in electrical contact with the cathode and the anode and the cathode and the anode will, of course, be in electrical contact with the respective cathode and anode current collectors.

The electrocatalyst particles may also be coated with an ion exchange resin to facilitate proton transfer in the catalyst electrode as well as to increase the affinity with the ion exchange membrane. As mentioned above, a chemical "short" will occur due to the contact of the electrocatalyst particles with crossover hydrogen and oxygen gases (the problem of the chemical "short" will be especially troublesome if the ion exchange membrane does not contain any reaction catalyst particles.)

The electrocatalyst particles and the catalyst metal particles capable of promoting the reaction of hydrogen and oxygen gases into water are not necessarily, but are conveniently, comprised of the same material. Suitable examples of materials for use as the electrocatalyst particles include platinum or platinum-ruthenium alloy for the anode and platinum or platinum-nickel alloy for the cathode. Suitable examples of materials for use as the catalyst metal particles include platinum, palladium, rhodium, iridium, ruthenium or alloys of one or more of the foregoing.

The electrocatalyst particles disposed in the electrode will be disposed near the surface of the ion exchange resin. The assembly comprising the cathode current collector, cathode, ion exchange membrane, anode and anode current collector may be dipped in an aqueous solution of a platinum amine salt to ion-exchange the exchange groups of the ion exchange resin in the electrodes with the platinum cation and then the electrocatalyst is supported in the vicinity of the surface by reducing the platinum ion by means of a reducing agent such as hydrazine.

The choice of materials for fabrication of the current collector is not limited. The current collector may comprise corrosion-resistant materials such as carbon or metal mesh. The current collector and the electrode are desirably integrated by means of hotpressing, cold-pressing or the like prior to assembly of the fuel cell.

The components of the fuel cell, i.e. cathode current collector, cathode, ion exchange membrane, anode and anode current collector, in such sequence, are fastened and integrated as a sandwich by means of hotpressing or by means of fastening plates located at the ends of the sandwich. Desirably, the fastening is carried out by employing the fastening plates and bolts which penetrate the ion exchange membrane. Alternatively, the components of the sandwich may be affixed to one another by means of an elastic covering surrounding the entire sandwich.

Figure 2:
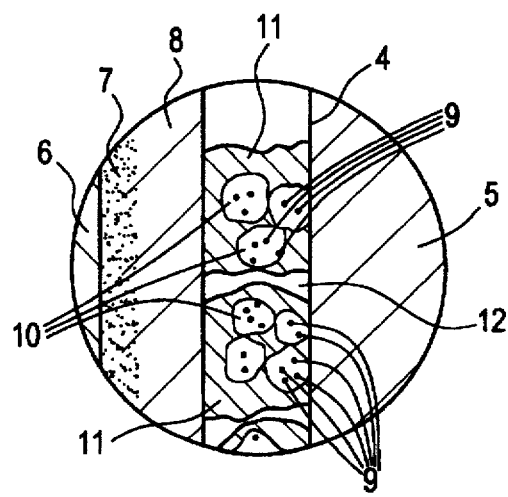
FIG. 2 is an enlarged view of a portion of FIG. 1.

Referring now to FIGS. 1 and 2, the fuel cell is comprised of an anode current collector 1, an anode 2, an ion exchange membrane 3, a cathode 4 and a cathode current collector 5 arranged in such sequence from the left as a sandwich. The ion exchange membrane 3 possesses an anode side 6 which is thick, has relatively excellent ionic conductivity but is inferior in chemical resistance, and a cathode side 8 which has inferior ionic conductivity but is superior in chemical resistance to the anode side 6 of exchange membrane 3. Exchange membrane 3 contains a catalyst metal layer 7 formed on the entire surface of the cathode side 8 opposite to the cathode current collector 5. Cathode 4 consists of a plurality of colonies which have been prepared by coating electrocatalyst particles 10 with a perfluorocarbon-type resin 11. Electrocatalyst particles 10 are 30 comprised of carbon particles supporting an electrocatalyst metal 9 such as platinum. Cavities 12 are formed among the colonies for diffusion of reactant gas. Electrocatalyst particles 10 are electrically connected through the carbon supports to current collector 5 and catalyst metal layer 7 is electrically insulated from current collectors 1 and 5.

Catalyst metal layer 7 is located nearer to cathode 4 than to anode 2 and is in contact with a radical which may be generated on cathode 4 and hydrogen gas to convert them into an inactive substance and water, thereby protecting ion exchange membrane 3. Further, catalyst metal layer 7 promotes the reaction between hydrogen and oxygen gases which crossover through ion exchange membrane 3 to convert them into water to prevent a reduction in cell voltage.

Figure 3:
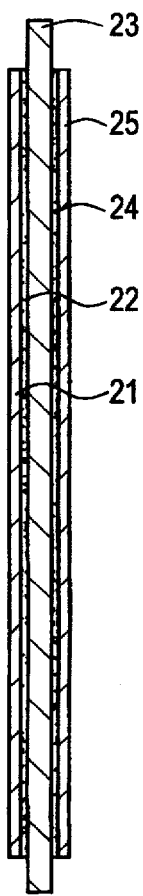
FIG. 3 is a longitudinal section showing another embodiment of a solid polymer electrolyte fuel cell in accordance with the present invention.
Figure 4:
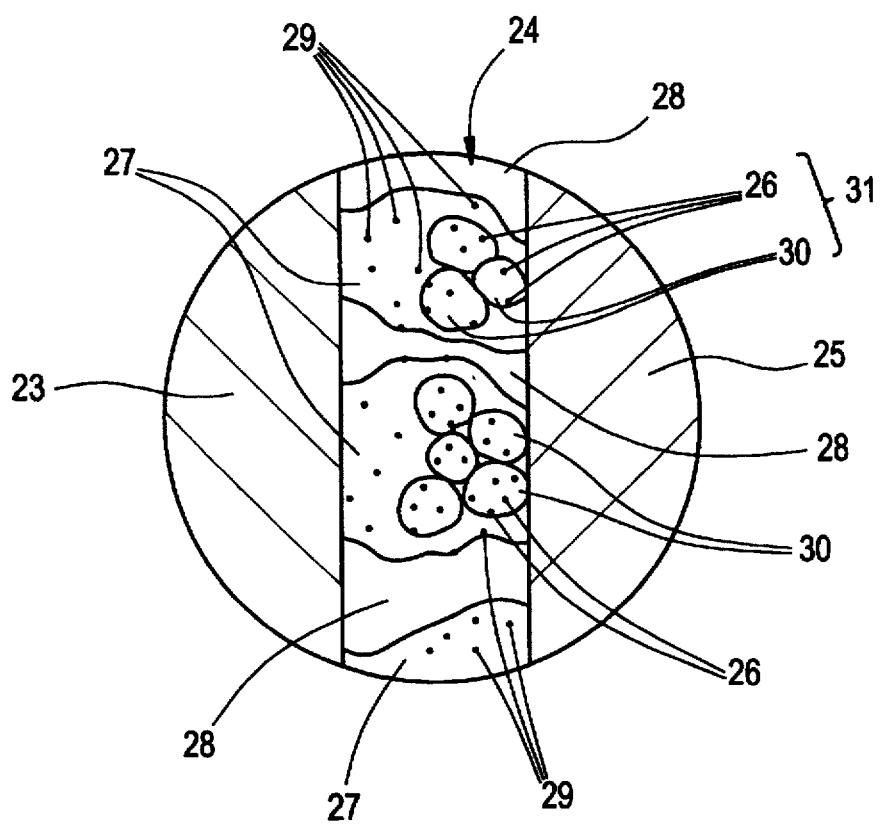
FIG. 4 is an enlarged view of a portion of FIG. 3.

Referring now to FIGS. 3 and 4, the fuel cell is comprised of an anode current collector 21, an anode 2, an ion exchange membrane 23, a cathode 24 and a cathode current collector 25 arranged in such sequence from the left as a sandwich. Cathode 24 consists of a plurality of colonies which have been prepared by coating carbon particles supporting electrocatalyst particles 26 with perfluorocarbon-type ion exchange resin 27. Catalyst metal particles 29 such as platinum are dispersed in resin 27 which have no electronic contact with catalyst metal particles 29 for the diffusion of reactant gas. Cavities 28 are formed among the colonies.

In FIG. 4, catalyst metal particle 29 is present in ion exchange resin 27 such that it is electrically insulated from cathode current collector 28; however, electrocatalyst particle 26 is in electrical communication with cathode current collector 25 through an electroconductive catalyst support particle 30.

Catalyst metal particle 29 is preferably disposed in cathode 24 rather than in anode 22 in order to catalytically react a radical which may be generated on cathode 24 with hydrogen gas diffused from anode 24 to convert them into an inactive substance and water for protecting ion exchange membrane 23. This feature also prevents a reduction of cell voltage by promoting the reaction between the hydrogen and oxygen gases which crossover in ion exchange membrane 23 to convert them into water.

The following nonlimiting examples shall serve to illustrate the invention. It is to be understood that departures may be made from the specific details of the examples without departing from the scope of the invention as defined by the claims hereinbelow.

EXAMPLE 1

After 10 g of carbon powder was impregnated with an aqueous solution of chloroplatinic acid (platinum concentration was 150 g/liter), a platinum-carbon catalyst on a platinum support (the support was 30% by weight) was prepared by thermal decomposition. The carbon catalyst was impregnated with a commercially available ion exchange resin dispersion solution ["Nafion" (trademark of DuPont) solution] and then dried to form an ion exchange resin layer of the surface of the catalyst. The catalyst powder was then fractionated such that the average platinum-supporting amount became 0.3 mg/cm$^3$, and the fractionated powder was then redispersed in alcohol.

The dispersion was then filtered under weak suction to adhere the catalyst powder on a filter paper having a diameter of 50 cm with a small amount of the alcohol remaining on the filter paper. The filter paper was hotpressed at 130° C. and 5 kg/cm$^2$ with a hydrophobically treated carbon paper having a diameter of 20 cm and a thickness of 360 μm functioning as a current collector to prepare an electrode equipped with the current collector having a cathode or anode on one surface.

A platinum layer (i.e. reaction catalyst layer) was formed by means of sputtering onto a hydrocarbon ion exchange membrane on the anode side having a thickness of 50 μm and an EW value of 900.

A commercially available perfluorocarbon-type ion exchange resin solution ("Nafion" solution) was applied on the catalyst layer on the anode side of the ion exchange membrane and dried at 60° C. to form an ion exchange membrane having a catalyst layer whose total thickness was 60 μm.

The fuel cell was then assembled by layering the anode, ion exchange membrane and cathode in sequence and placing fastening plates having apertures on their four corners on both sides of the assembly. Assembly was completed by inserting bolts through the respective apertures and fixing the bolts with nuts. The perfluorocarbon ion exchange membrane side was placed adjacent to the cathode catalyst layer.

The cell voltage of this fuel cell was measured under the following conditions. Supply gases to the anode and cathode were humidified hydrogen and non-humidified hydrogen of one atmosphere pressure, respectively, and an open circuit voltage and a voltage at a current density of 1 A/cm$^2$ were measured at 80° C. Both the initial open cell voltage and that after 10 hours were about 1020 mV. The initial cell voltage and that after 100 hours at 1 A/cm$^2$ were 620–640 mv.

These results indicate that the cell voltage remains stable over a period of 100 hours of operation of the fuel cell.

Comparative Example 1

A fuel cell was prepared in the same manner as that of Example 1 except that the catalyst layer was not formed and the cell voltage was measured under the same conditions as that of Example 1. The initial open circuit cell voltage and that after 100 hours of operation were 820 mV and 810 mV, respectively, and those at a current density of 1 A/cm$^2$ were 615 mV and 220 mV.

It can be seen by comparing the cell voltages of Example 1 and Comparative Example 1 that a considerable reduction of cell voltage occurred; such reduction most likely occurred as the result of crossover of the hydrogen and oxygen gases and a deterioration of the membrane employed in Comparative Example 1.

EXAMPLE 2

The components of the fuel cell were assembled in the same manner as that of Comparative Example 1. The cathode prepared in the same manner as Example 1 was impregnated in an aqueous solution of a platinum amine salt (platinum concentration: 0.3 g/liter). The salt was then reduced, by means of hydrazine to support, in the cathode and platinum thus prepared which was a reaction catalyst metal electrically connected to the current collector and platinum which was another reaction catalyst metal which was not electrically connected to the current collector. Only very small amounts of platinum thus prepared were connected electrically to the current collectors and functioned as electrocatalysts.

The cell voltages of this fuel cell were measured under the same conditions as those of Example 1. The initial open circuit voltage and that after 100 hours of operation were about 1013 mV, and those at a current density of 1 A/cm$^2$ were 610 to 655 mV.

The foregoing results indicate that the cell voltage remains stable over a period of 100 hours of operation of the fuel cell.

What is claimed is:

1. A sandwich-type solid polymer electrolyte fuel cell comprising in sequence: a cathode current collector; a cathode electrically connected to the cathode current collector, said cathode containing a cathode ion exchange resin and cathode electrocatalyst particles in electrical communication with the cathode; an ion exchange membrane; an anode containing an anode ion exchange resin and anode electrocatalyst particles in electrical communication with the anode; and a anode current collector electrically connected to the anode, said cathode and/or anode ion exchange resins containing a cathode and/or anode catalyst metals capable of promoting the reaction of hydrogen and oxygen gases to produce water, said cathode and/or anode catalyst metals being insulated electrically from current collectors due to the presence of the cathode and/or anode ion exchange resins which have no electrical conductivity.

2. The fuel cell of claim 1 wherein the catalyst metal is present only in the cathode.

3. The fuel cell of claim 1 wherein said cathode and/or catalyst metals are also present within the ion exchange membrane.

4. The fuel cell of claim 1 wherein the membrane comprises a perfluorocarbon ion exchange resin containing sulfonic acid groups.

5. The fuel cell of claim 1 wherein the membrane comprises a perfluorocarbon ion exchange resin containing carboxylic acid groups.

6. The fuel cell of claim 1 wherein the membrane comprises a hydrocarbon ion exchange resin containing sulfonic acid groups.

7. The fuel cell of claim 1 wherein the membrane comprises a hydrocarbon ion exchange resin containing carboxylic acid groups.

8. The fuel cell of claim 1 wherein the membrane comprises a composite membrane composed of a per- fluorocarbon ion exchange resin and a hydrocarbon ion exchange resin.

* * * * *